United States Patent [19]
Nachbur et al.

[11] 3,855,309
[45] Dec. 17, 1974

[54] PROCESS FOR THE MANUFACTURE OF PHOSPHORUS-CONTAINING CONDENSATION PRODUCTS, THE PRODUCTS AND THEIR USE AS FLAMEPROOFING AGENTS

[75] Inventors: Hermann Nachbur, Dornach; Arthur Maeder, Therwill, both of Switzerland

[73] Assignee: Ciba-Geigy AG, Basel, Switzerland

[22] Filed: Aug. 31, 1972

[21] Appl. No.: 285,418

[30] Foreign Application Priority Data
Jan. 14, 1972 Switzerland............................ 522/72

[52] U.S. Cl. ............ 260/606.5 P, 117/136, 117/137, 260/2 P, 260/2 EP, 260/606.5 F
[51] Int. Cl. ............................................... C07f 9/28
[58] Field of Search ....... 260/606.5 P, 606.5 F, 2 P, 260/2 EP

[56] References Cited
UNITED STATES PATENTS

| | | | |
|---|---|---|---|
| 2,913,436 | 11/1959 | Reeves et al. | 260/606.5 F |
| 3,221,057 | 11/1965 | Gordon et al. | 260/606.5 F |
| 3,248,429 | 4/1966 | Baranaukas | 260/606.5 P |
| 3,251,883 | 5/1966 | Rauhut et al. | 260/606.5 F |
| 3,434,981 | 3/1969 | Bananaukas | 260/606.5 F |

Primary Examiner—Patrick P. Garvin
Assistant Examiner—A. P. Demers
Attorney, Agent, or Firm—Joseph G. Kolodny; Edward McC. Roberts; Prabodh I. Almaula

[57] ABSTRACT

The subject of the invention is a process for the manufacture of water-soluble condensation products of hydroxymethyl-phosphonium compounds and tri-glycidylisocyanurate, characterised in that (a) 1 mol of a tetrakis-(hydroxymethyl)-phosphonium compound is condensed with (b) 0.02 to 0.5 mol, preferably 0.05 to 0.3 mole, of tri-glycidylisocyanurate at 40° to 120°C, optionally in the presence of formaldehyde or a formaldehyde-releasing agent and an inert organic solvent, the condensation is optionally thereafter continued at temperatures of 100° to 150°C and, if appropriate, free hydroxyl groups are etherified at least partially with at least one alkanol with 1 to 4 carbon atoms and, if appropriate, the salts of the condensation products are converted into the corresponding hydroxides.

The condensation products are used for flameproofing organic fibre material, especially textiles.

10 Claims, No Drawings

PROCESS FOR THE MANUFACTURE OF PHOSPHORUS-CONTAINING CONDENSATION PRODUCTS, THE PRODUCTS AND THEIR USE AS FLAMEPROOFING AGENTS

The subject of the invention is a process for the manufacture of water-soluble condensation products of hydroxymethyl-phosphonium compounds and tri-glycidylisocyanurate, characterised in that (a) 1 mol of a tetrakis-(hydroxymethyl)-phosphonium compound is condensed with (b) 0.02 to 0.5 mol, preferably 0.05 to 0.3 mol, of tri-glycidylisocyanurate at 40° to 120°C, optionally in the presence of formaldehyde or a formaldehyde-releasing agent and an inert organic solvent, the condensation is optionally thereafter continued at temperatures of 100° to 150°C and, if appropriate, free hydroxyl groups are etherified at least partially with at least one alkanol with 1 to 4 carbon atoms and, if appropriate, the salts of the condensation products are converted into the corresponding hydroxides.

The condensation is preferably carried out at 70° to 110°C in an inert organic solvent or solvent mixture. For this, aromatic hydrocarbons are above all suitable, such as, for example, toluene, o-, m- or p-xylene or a mixture thereof, or xylene-toluene, xylene-benzene or xylene-decahydronaphthalene mixtures. Preferably, the optional subsequent further condensation is carried out at 125° to 140°C or, in particular, at about 135°C, that is to say the boiling point of the solvent or solvent mixture.

At the same time it is however also possible to carry out the condensation in the absence of an inert organic solvent, for example by using an already prepared condensation product as the solvent or by carrying out the condensation in the melt.

An appropriate procedure is to heat the tetrakis-(hydroxymethyl)-phosphonium compound, which as a rule is in the form of an aqueous solution, together with the component (b), optionally in a solvent, to the boil and to distill off the water.

Possible tetrakis-(hydroxymethyl)-phosphonium compounds are above all salts and the hydroxide.

Suitable tetrakis-(hydroxymethyl)-phosphonium salts are, for example, the formate, acetate, phosphate or sulphate and the halides, such as, for example, the bromide or especially the chloride. Tetrakis-(hydroxymethyl)-phosphonium chloride is hereafter referred to as THPC.

Where the tetrakis-(hydroxymethyl)-phosphonium hydroxide (THPOH) is used as the starting product, it is appropriately manufactured beforehand from a corresponding salt, for example THPC, by neutralisation, in aqueous solution, with a base, for example sodium hydroxide, followed by dehydration.

The component (b) is the compound of the formula

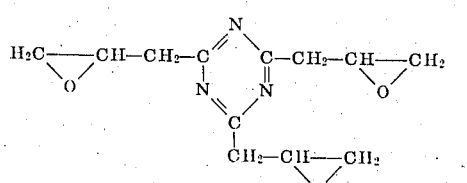

The component (b) is preferably condensed with the component (a) in the absence of formaldehyde or a formaldehyde-releasing agent. The formaldehyde which is optionally used conjointly is preferably in the form of an aqueous solution. A possible formaldehye-releasing agent is above all paraformaldehyde.

The etherification, which is optionally to be carried out, of the condensation product which still contains free hydroxyl groups is effected with, for example, n-butanol, n-propanol, ethanol or especially methanol. Preferably, this is done in an acid medium.

The acid catalysts optionally used conjointly in the condensation are preferably acid salts (Lewis acids) such as magnesium chloride, iron-III chloride, zinc nitrate or boron trifluoride/diethyl ether. The conjoint use of these catalysts is particularly advisable in the case of the condensation with THPOH.

After completion of condensation and, if appropriate, etherification, the salts of the condensation products can also be completely or partially converted into their corresponding hydroxides, which as a rule is achieved by adding strong bases, such as alkali metal hydroxides or alkaline earth metal hydroxides, for example sodium hydroxide, potassium hydroxide or calcium hydroxide, and also sodium carbonate. The amount of base is appropriately so chosen that the pH value of the reaction mixture is about 5 to 8. This conversion into the hydroxy compound is appropriately effected in the application bath.

At times, the end products have an unpleasant odour caused by volatile low molecular trivalent phosphorus compounds, for example phosphines, such as trihydroxymethylphosphine. This odour can be eliminated by an oxidative after-treatment of the condensation product, for example by passing air or oxygen into the reaction mixture or by adding oxidising agents, such as hydrogen peroxide or potassium persulphate.

The condensation products are used for flameproofing organic fibre material, especially textiles. An appropriate procedure for this is to treat these materials with an aqueous preparation which contains at least (1) a condensation product of the indicated nature and (2) a polyfunctional compound which differs from the condensation products according to (1), and to finish the materials treated in this way by the wet batch process, the moist batch process or especially the ammonia process, or above all by the thermofixing process.

The component (2) preferably consists of polyfunctional epoxides or above all of polyfunctional nitrogen compounds. Possible epoxides are above all epoxides which are liquid at room temperature and have at least two epoxide groups which are preferably derived from polyhydric phenols. Polyfunctional nitrogen compounds are, for example, polyalkylenepolyamines or, in particular, aminoplast-forming agents or aminoplast precondensates. The latter are preferred.

By aminoplast-forming agents there are understood nitrogen compounds which can be methylolated, and by aminoplast precondensates there are understood addition products of formaldehyde to nitrogen compounds which can be methylolated. As aminoplast-forming agents or nitrogen compounds which can be methylolated, there may be mentioned: 1,3,5-aminotriazines such as N-substituted melamines, for example N-butylmelamine, n-trihalogenomethylmelamines, triazones, and also ammeline, guanamines, for example benzoguanamines or acetoguanamines, or also diguanamines.

Further possibilities are: cyanamide, acrylamide, alkylurea or arylurea and alkylthioureas or arylthioureas, alkyleneureas or alkylenediureas, for example urea, thiourea, urones, ethyleneurea, propyleneurea, acetylenediurea or especially 4,5-dihydroxyimidazolidone-2 and derivatives thereof, for example 4,5-dihydroxyimidazolidone-2 substituted in the 4-position, at the hydroxyl group, by the $-CH_2CH_2CO-NH-CH_2OH$ radical. The methylol compounds of a urea, of an ethyleneurea or in particular of melamine are preferentially used. Valuable products are provided in general by products which are as highly methylolated as possible, but in particular also by products with low methylolation, such as etherified or non-etherified methylolmelamines, for example dimethylolmelamine or trimethylolmelamine or mixtures thereof. Suitable aminoplast precondensates are both predominantly monomolecular aminoplasts and also more highly precondensed aminoplasts.

The ethers of these aminoplast precondensates can also be used together with the reaction products. For example, the ethers of alkanols such as methanol, ethanol, n-propanol, isopropanol, n-butanol or pentanols, are of advantage. It is however desirable that these aminoplast precondensates should be water-soluble, such as, for example, the pentamethylolmelamine-dimethylether or the trimethylolmelamine-dimethyl-ether.

The organic fibre materials to be provided with a flameproof finish are, for example, wood, paper, furs, hides or, preferably, textiles. In particular, fibre materials of polyamides, cellulose, cellulose-polyester or polyester are flameproofed, with fabrics of wool or polyester or above all mixed fabrics of polyester — cellulose, wherein the ratio of the polyester constituent to the cellulose constituent is 1:4 to 2:1, being preferred. Thus, for example, so-called 20/80, 26/74, 50/50 or 67/33 polyester-cellulose mixed fabrics can be used.

The cellulose or the cellulose constituent of the fibre material originates, for example, from linen, cotton, rayon or staple viscose. In addition to polyester-cellulose fibre mixtures it is also possible to use fibre mixtures of cellulose with natural or synthetic polyamides. Above all, fibre materials of wool can also be flameproofed well with the condensation products.

The aqueous preparations for flameproofing the organic fibre materials as a rule contain 200 to 800 g/l, preferably 350 to 600 g/l. of the component (1) and 20 to 200 g/l, preferably 40 to 120 g/l, of the component (2). The preparations in most cases have an acid to neutral or weakly alkaline pH value.

The preparations for flameproofing can optionally contain yet further additives. To achieve a greater deposit of material on fabrics it is advantageous, for example, to add 0.1 to 0.5% of a high molecular polyethylene glycol. Further, the customary plasticisers, for example an aqueous polyethylene emulsion or silicone oil emulsion, can be added to the preparations.

To improve the mechanical strengths of the fibres, suitable copolymers can also be added to the preparations, for example copolymers of N-methylolacrylamide or cationic copolymers. For example, aqueous emulsions of copolymers of (a) 0.25 to 10% of an alkaline earth metal salt of an $\alpha.\beta$-ethylenically unsaturated monocarboxylic acid, (b) 0.25 to 30% of a N-methylolamide or N-methylolamide-ether of an $\alpha.\beta$-ethylenically unsaturated monocarboxylic or dicarboxylic acid and (c) 99.5 to 60% of at least one other copolymerisable compound are advantageous in this context. These copolymers and their manufacture are known. The tenacity and abrasion resistance of the treated fibre material can be favourably influenced by the conjoint use of such a copolymer.

If a polymer of the indicated type is further added to the preparation, the amounts are advantageously small, for example 1 to 10%, relative to the amount of the condensation product. The same is true of any plasticiser, where the appropriate amounts can again be 1 to 10%.

It is also possible, though in most cases not necessary, to add curing catalysts such as, for example, ammonium chloride, ammonium dihydrogen orthophosphate, phosphoric acid, magnesium chloride or zinc nitrate.

The pH value of the preparations is as a rule 2 to 7.5, preferably 4 to 7, and is adjusted in the usual manner by adding acid and bases.

It can also be advantageous to add buffer substances, for example $NaHCO_3$, disodium phosphate and trisodium phosphate and triethanolamine.

To improve the durability of the flameproof finishes and to achieve a soft handle, it can be advantageous to add to the aqueous preparations halogenated paraffins in combination with a polyvinyl halide compound.

The preparations are now applied to the fibre materials, and this can be done in a manner which is in itself known. Preferably, piece goods are used and impregnated on a padder which is charged with the preparation at room temperature.

In the preferred thermofixing process, the fibre material impregnated in this way must now be dried and subjected to a heat treatment. It is appropriately dried at temperatures of up to 100°C. Thereafter the material is subjected to a heat treatment at temperatures above 100°C, for example 100° to 200°C, preferably 120° to 180°C, the duration of which can be the shorter, the higher is the temperature. This duration of heating, is, for example, 30 seconds to 10 minutes.

If the moist fixing process is used, the fabric is first dried to a residual moisture content of about 5 to 20% and then batched for 12 to 48 hours at about 40° to 60°C, rinsed, washed and dried. In the wet fixing process, a similar procedure is followed except that the completely wet fibre material is batched. In the ammonia fixing process, the treated fibre material is first, in the moist state, gassed with ammonia and is subsequently dried.

A rinse with an acid-binding agent, preferably with aqueous sodium carbonate solution, can be desirable in the case of a strongly acid reaction medium.

The percentages and parts in the examples which follow are parts by weight or percentages by weight. The relationship of parts by volume to parts by weight is as of ml to g.

EXAMPLE 1

196 parts of a 78% strength aqueous THPC solution (0.8 mol), 40 parts of triglycidylisocyanurate (0.16 mol) of the formula (1) and 200 parts of a xylene isomer mixture are heated to the boil, with rapid stirring, in a stirred vessel of 500 parts by volume capacity which is equipped with a water separator and thermometer. The azeotropic removal of the water from the aqueous THPC solution starts at a boiling point of 101°C. After removal of this water (about 43 parts) the boiling point of the xylene is 130° to 133°C. A further 15 parts of water are now removed azeotropically by additional treatment at this temperature, after which the condensation product forms a highly viscous mass. It is cooled to 95°C, the product is dissolved by adding 200 parts of water and the xylene is largely siphoned off. The aqueous solution is completely evaporated in vacuo at 70°C. 162 parts of a yellow, highly viscous product are obtained. The active substance content is 100%. The infrared spectrum of this product shows the following bands:

| | | | |
|---|---|---|---|
| Broad | band at approx. | 3,260 cm⁻¹ | strong |
| Broad | do. | 2,910 do. | weak |
| Broad shoulder | do. | 2,840 do. | medium |
| Broad shoulder | do. | 2,660 do. | medium |
| Broad shoulder | do. | 2,480 do. | weak |
| Broad shoulder | do. | 2,340 do. | weak |
| Broad | do. | 2,070 do. | weak |
| Broad shoulder | do. | 1,755 do. | medium |
| Broad | do. | 1,675 do. | medium-strong |
| Broad shoulder | do. | 1645 cm⁻¹ | medium-strong |
| Broad | do. | 1,460 do. | medium-strong |
| Broad shoulder | do. | 1,425 do. | medium |
| Sharp | do. | 1,300 do. | weak-medium |
| Broad shoulder | do. | 1,250 do. | weak |
| Broad shoulder | do. | 1,205 do. | weak |
| Broad | do. | 1,140 do. | weak |
| Broad | do. | 1,095 do. | weak |
| Broad | do. | 1,040 do. | medium |
| Broad | do. | 910 do. | medium |
| Shapr | do. | 760 do. | weak |

EXAMPLE 2

244 parts of a 78% strength aqueous THPC solution (1 mol), 124 parts of triglycidylisocyanurate (0.5 mol) and 160 parts of benzene are heated to the boil, with rapid stirring, in a stirred vessel of 500 parts by volume capacity which is equipped with a water separator, reflux condenser and thermometer. The azeotropic removal of the water from the aqueous THPC solution and of the water formed by condensation commmences at 78°C, and at the same time a vigorous reaction occurs, manifesting itself through copious foaming extending as far as the condenser. The reaction can be kept under control by cooling with ice. When the reaction has subsided, the azeotropic removal of the water is continued at the boiling point of the benzene. When a total of 56 parts of water have been separated off, the condensation product formed can no longer be stirred. 200 parts of water are added, after which the product can be dissolved. The benzene is thereafter siphoned off as far as possible and thereafter the remaining benzene and the water are removed in vacuo at 60°C. 293 parts of a solid condensation product are obtained. The phosphorus content is 10.6%. The infra-red spectrum of this product shows the following bands:

| | | | |
|---|---|---|---|
| Broad | band at approx. | 3,260 cm⁻¹ | strong |
| Broad shoulder | do. | 2,970 do. | weak |
| Sharp | do. | 2,920 do. | weak |
| Broad shoulder | do. | 2,860 do. | medium |
| Broad shoulder | do. | 2,640 do. | weak-medium |
| Broad shoulder | do. | 2,480 do. | weak |
| Broad shoulder | do. | 2,370 do. | weak |
| Broad | do. | 2,070 do. | weak |
| Sharp shoulder | do. | 1,760 do. | medium |
| Broad | do. | 1,685 do. | medium-strong |
| Broad | do. | 1,465 do. | medium-strong |
| Broad shoulder | do. | 1,420 do. | weak |
| Broad shoulder | do. | 1,385 do. | weak |
| Broad | do. | 1,310 do. | weak |
| Broad | do. | 1,255 do. | weak |
| Broad | do. | 1,195 do. | weak |
| Broad shoulder | do. | 1,085 do. | medium |
| Broad | do. | 1,045 do. | medium |
| Sharp | do. | 965 do. | weak |
| Broad shoulder | do. | 905 do. | weak-medium |
| Broad shoulder | do. | 870 do. | weak |
| Sharp | do. | 765 do. | weak-medium |

EXAMPLE 3

244 parts of a 78% strength aqueous THPC solution (1 mol) are cooled to 10°C in a stirred vessel of 500 parts by volume capacity which is equipped with a reflux condenser and thermometer, and are neutralised to pH 7.2 by slowly adding 49.7 parts of 30% strength aqueous sodium hydroxide solution, whilst stirring rapidly. Thereafter 24.9 parts of triglycidylisocyanurate (0.1 mol) are added and the mixture is condensed for 2 hours at 100°–110°C internal temperature. After cooling, 213 parts of a yellowish, low-viscosity solution of the condensation product are obtained and are diluted with water to 80% active substance content. The phosphorus content of this solution is 11.6%. The infrared spectrum of this product shows the following bands:

| | | | |
|---|---|---|---|
| Broad | band at approx. | 3,260 cm⁻¹ | strong |
| Broad shoulder | do. | 2,970 do. | weak |
| Sharp | do. | 2,920 do. | weak |
| Broad shoulder | do. | 2,850 do. | weak-medium |
| Broad shoulder | do. | 2,650 do. | weak-medium |
| Broad shoulder | do. | 2,360 do. | weak |
| Broad | do. | 2,070 do. | weak |
| Broad shoulder | do. | 1,750 do. | weak |
| Sharp | do. | 1,685 do. | medium-strong |
| Broad shoulder | do. | 1,640 do. | medium |
| Sharp | do. | 1,465 do. | medium-strong |
| Broad | do. | 1,415 do. | medium |
| Broad | do. | 1,305 do. | weak |
| Broad | do. | 1,260 cm⁻¹ | weak |
| Broad | do. | 1,190 do. | weak |
| Broad | do. | 1,040 do. | medium-strong |
| Broad shoulder | do. | 1,015 do. | medium-strong |
| Broad shoulder | do. | 920 do. | weak-medium |
| Broad shoulder | do. | 885 do. | weak |
| Broad shoulder | do. | 800 do. | weak |
| Sharp | do. | 760 do. | weak |

EXAMPLE 4

244 parts of a 78% strength aqueous solution of THPC (1 mol) and 4.9 parts of triglycidylisocyanurate (0.02 mol) in 200 parts of toluene are heated to the boil, with rapid stirring, in a stirred vessel of 500 parts by volume capacity which is equipped with a reflux condenser, water separator and thermometer. The azeotropic removal of the water from the aqueous THPC solution, and of the water formed by condensation (a total of 54 parts of water) commences at a boiling point of 92°C. After removal of this amount of water the boiling point rises to 108°C without further water being formed. The mixture is cooled to approx. 40°C, the toluene is siphoned off as far as possible and the condensation product is dissolved in 80 parts of methanol. After adding 0.15 part of 37% strength aqueous hydrochloric acid the mixture is etherified for 30 minutes at the boiling point of the methanol (65°C). Finally, the excess methanol is removed in vacuo at 60°C. 190 parts of a white, crystalline product are obtained. The phosphorus content is 16.3%. The infra-red spectrum of this product shows the following bands:

| Broad | band at approx. | 3,240 cm⁻¹ | strong |
|---|---|---|---|
| Broad shoulder | do. | 2,970 do. | weak |
| Sharp | do. | 2,920 do. | weak |
| Broad shoulder | do. | 2,850 do. | weak-medium |
| Broad shoulder | do. | 2,620 do. | weak-medium |
| Broad shoulder | do. | 2,480 do. | weak |
| Broad shoulder | do. | 2,340 do. | weak |
| Broad | do. | 2,070 do. | weak |
| Broad | do. | 1,685 do. | medium |
| Broad | do. | 1,625 do. | medium |
| Broad shoulder | do. | 1,460 do. | medium |
| Broad | do. | 1,415 do. | medium |
| Sharp | do. | 1,295 do. | weak |
| Broad | do. | 1,195 do. | weak |
| Sharp | do. | 1,040 do. | strong |
| Broad shoulder | do. | 915 do. | medium |
| Broad shoulder | do. | 875 do. | weak |
| Broad shoulder | do. | 810 do. | weak |

EXAMPLE 5

Mixed fabrics of polyester/cotton (PES/CO) (67/33) are padded with the liquors according to Table 1 below, dried for 30 minutes at about 80°C and subsequently cured for 5 minutes at 150°C.

The fabric is then washed for 5 minutes at 60°C in a liquor which per litre contains 5 ml of hydrogen peroxide (35% strength), 3 g of aqueous sodium hydroxide solution (30% strength) and 1 g of a 25% strength aqueous solution of a condensation product of 1 mol of p-tert.-nonylphenol and 9 mols of ethylene oxide. Thereafter the fabric is rinsed and dried.

The degree of fixing indicates the amount of the product present on the fibre after rinsing (relative to the amount originally taken up).

The fabrics are then washed up to 40 times for 45 minutes at 60°C in a domestic washing machine, in a liquor which contains 4 g/l of a domestic detergent (SNV 198,861 wash).

The individual fabric samples are then tested for their flameproof character (DIN 53,906 vertical test; ignition time 6 seconds).

The results are summarised in Table 1 below.

Table 1

| | untreated | treated with liquor |
|---|---|---|
| Product according to Example 1, g/l | | 550 |
| Dimethylolmelamine g/l | | 96.5 |
| pH-Value of the bath (adjusted with NaOH) | | 5.5 |
| g of Phosphorus per kg of fabric | | 51 |
| Liquor uptake, % | | 75 |
| Degree of Fixing, % | | 76 |
| Flameproof Character | | |
| After rinsing | | |
| smouldering time (seconds) | burns | 0 |
| tear length (cm) | | 12.5 |
| After 20 washes | | |
| smouldering time (seconds) | burns | 0 |
| tear length (cm) | | 9 |
| After 40 washes | | |
| smouldering time (seconds) | burns | 0 |
| tear length (cm) | | 8.5 |

EXAMPLE 6

Mixed fabrics of polyester/cotton (PES/CO), 50:50, are padded with the liquors of Table 2 below and then finished by the thermofixing process, with subsequent washing at 60°C, as indicated in Example 5.

The fabrics are then washed at 60°C as indicated in Example 5 and then tested according to DIN 53,906 (ignition time 6 seconds) for their flameproof character. Untreated fabrics burn away.

The results are summarised in Table 2 which follows.

Table 2

| Constituents, g/l | Treated with PES/CO 50:50 | | |
|---|---|---|---|
| | A | B | C |
| Product according to Example | | | |
| 3 | 700 | | |
| 4 | | 500 | 500 |
| Di-Trimethylolmelamine | 103 | 103 | 103 |
| Silicon oil emulsion (40% strength) | 35 | 35 | 35 |
| pH-Value of the liquor | 7** | 4.5 | 6.5** |
| Degree of fixing, % | 54 | 62 | 62 |
| g of Phosphorus per kg of fabric | 57 | 57 | 57 |
| Liquor uptake, % | 70 | 70 | 70 |
| Flameproof Character: | burning time (seconds)/tear length (cm) | | |
| After rinsing | 2/10.5 | 2/11.5 | 2/9 |
| After 1 wash | 1/10.5 | 1/10 | 1/9 |

** Product converted into hydroxy compound

EXAMPLE 7

Mixed fabrics of polyester/cotton (PES/CO), 67:33 and 50:50, and wool fabrics, are padded with the liquors of Table 3 below and then finished by the thermofixing process with subsequent washing at 60°C (PES/CO) as indicated in Example 5. The wool is rinsed for 5 minutes at 40°C in a bath which contains 4 g/l of sodium carbonate and 1 g/l of a condensation product of 1 mol of p-tert.-nonylphenol and 9 mols of ethylene oxide.

The fabrics are then washed at 60°C (PES/CO) or 40°C (W) as indicated in Example 5 and are thereafter tested for their flameproof character according to DIN 53,906 (ignition time 6 seconds). Untreated fabrics burn away.

The results are summarised in Table 3 which follows.

Table 3

| Constituents, g/l | Treated with | | |
|---|---|---|---|
| | PES/CO 50:50 | PES/CO 65:33 | W |
| | A | B | C |
| Product according to Example | | | |
| 2 | 770 | 770 | |
| 3 | | | 580 |
| Di-trimethylolmelamine | | 103 | 84.5 |
| Trimethylolmelamine-dimethylol-ether (75% strength) | 153 | | |
| Condensation product* | | | 2 |
| Silicon oil emulsion (40% strength) | 35 | 35 | 35 |
| pH-Value of the liquor | 5.5 | 5.5 | 7** |
| Degree of fixing, % | 75 | 76 | 42 |
| g of Phosphorus per kg of fabric | 57 | 57 | 54 |
| Liquor uptake, % | 70 | 70 | 80 |
| Flameproof Character: burning time (seconds)/tear length (cm) | | | |
| After rinsing | 0/6.5 | 6/11.5 | 9/8 |
| After 1 wash | 1/10 | 4/11.5 | 8/10 |
| After 5 washes | 2/11.5 | 0/13 | 27/13 |

\* Condensation product of 1 mol of p-tert.-nonylphenol with 9 mols of ethylene oxide
\*\* Product converted into hydroxy compound.

EXAMPLE 8

Mixed fabrics of polyester/cotton (PES/CO), 67:33 and 50:50, and cotton fabrics (CO) are padded with the liquors according to Table 4 below and then finished according to the thermofixing process, with subsequent washing at 60°C (PES/CO) as indicated in Example 5. The cotton is rinsed at the boil for 5 minutes in a bath which contains 4 g/l of sodium carbonate and 1 g/l of a condensation product of 1 mol of p-tert.-nonylphenol and 9 mols of ethylene oxide.

The fabrics are then washed up to 20 times at 60°C (PES/CO) or 95°C (CO) as indicated in Example 5 and then tested for their flameproof character according to DIN 53,906 (ignition time 6 seconds). Untreated fabrics burn away.

The results are summarised in Table 4 which follows.

What is claimed is:

1. A process for the manufacture of water-soluble condensation products, comprising the step of reacting a tetrakis-(hydroxymethyl)-phosphonium compound with triglycidylisocyanurate, at a temperature in the range of 40° to 120°C, and in a molar ratio of 1:0.02 to 1:0.5.

2. The process of claim 1, wherein the starting materials are reacted in the presence of an inert organic solvent.

3. The process of claim 2, wherein the inert organic solvent is an aromatic hydrocarbon.

4. The process of claim 1, wherein the molar ratio is in the range of 1:0.05 to 1:0.15.

5. The process of claim 1, wherein the tetrakis-(hydroxymethyl)-phosphonium compound is a tetraki- Table 4

| Constituents, g/l | Treated with | | |
|---|---|---|---|
| | PES/CO 50:50 | PES/CO 67:33 | CO |
| | A | B | C |
| Product according to Example | | | |
| 2 | 770 | 770 | |
| 3 | | | 375 |
| Di-Trimethylolmelamine | 103 | | 120 |
| Trimethylolmelamine-dimethyl-ether (75% strength) | | 153 | |
| Silicon oil emulsion (40% strength) | 35 | 35 | 35 |
| pH-Value of the liquor | 5.5 | 5.5 | 7** |
| Degree of fixing, % | 75 | 72 | 64 |
| g of Phosphorus per kg of fabric | 57 | 57 | 35 |
| Liquor uptake | 70 | 70 | 80 |
| Flameproof Character: burning time (seconds)/tear length (cm) | | | |
| After rinsing | 0/7.5 | 1/11.5 | 0/5.5 |
| After 1 wash | 0/8.5 | 3/14 | 0/5.5 |
| After 5 washes | 1/9.5 | 0/9.5 | 0/8.5 |
| After 20 washes | 0/9 | 0/12.5 | 0/6 |

\*\* Product converted into hydroxy compound s-(hydroxymethyl)-phosphonium salt or tetrakis-(hydroxymethyl)-phosphonium hydroxide.

6. The process of claim 5, wherein the tetrakis-(hydroxymethyl)-phosphonium salt is a tetrakis-(hydroxymethyl)-phosphonium halide.

7. The process of claim 1, wherein the starting materials are reacted in the presence of formaldehyde.

8. The process of claim 1, comprising the further step of continuing the reaction at a temperature in the range of 100° to 150°C.

9. The process of claim 1, comprising the further step of treating the resulting condensation product with an alkanol of 1 to 4 carbon atoms to etherify at least part of the free hydroxyl groups thereof.

10. A water-soluble condensation product obtained by reacting a tetrakis-(hydroxymethyl)-phosphonium compound with triglycidylisocyanurate, at a temperature in the range of 40° to 120°C, and in a molar ratio of 1:0.02 to 1:0.5.

* * * * *